April 11, 1944.  C. W. LEGUILLON  2,346,439
TIRE BUILDING APPARATUS
Filed July 12, 1941   2 Sheets-Sheet 2
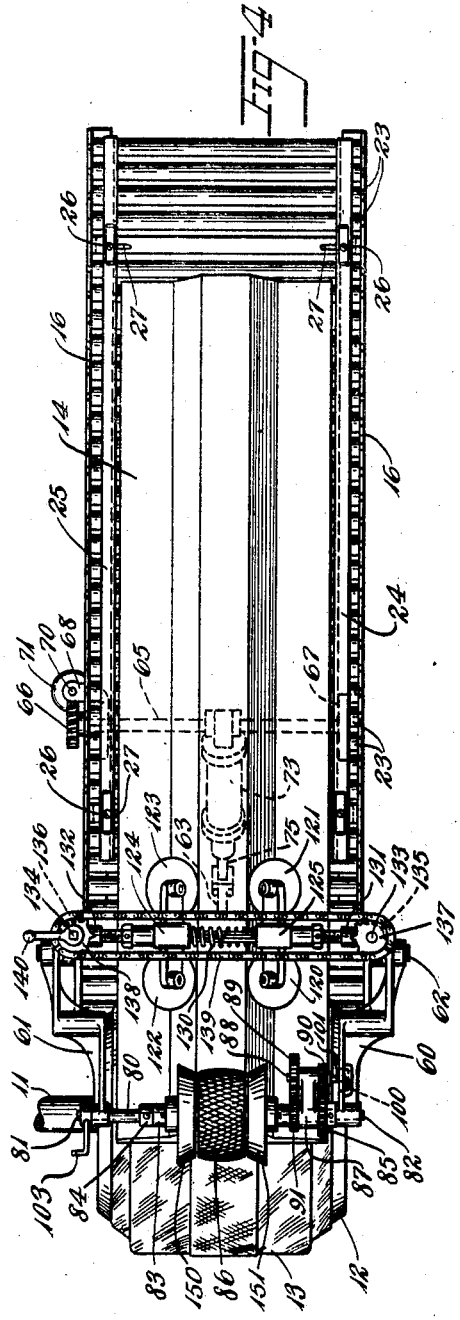
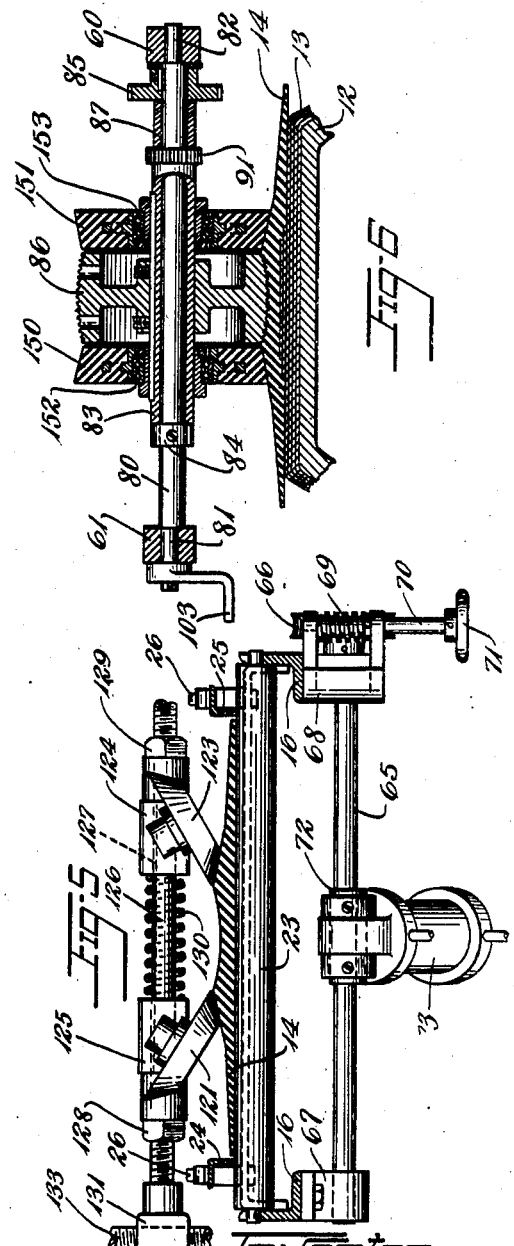
Inventor
Charles W. Leguillon
By Willis F. Avery
Atty.

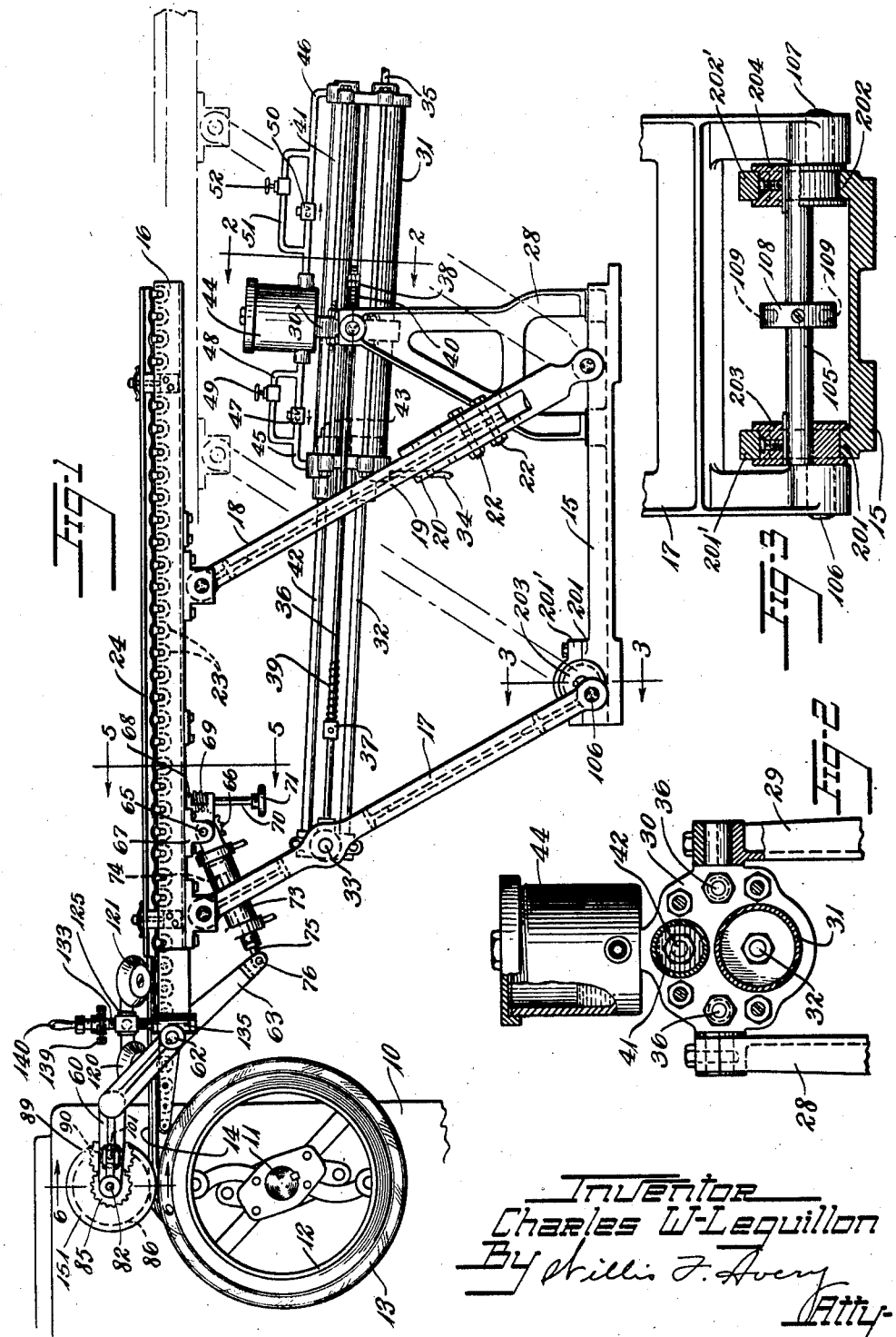

Patented Apr. 11, 1944

2,346,439

UNITED STATES PATENT OFFICE 2,346,439

TIRE-BUILDING APPARATUS

Charles W. Leguillon, Akron, Ohio, assignor to The B. F. Goodrich Company, New York, N. Y., a corporation of New York Application July 12, 1941, Serial No. 402,119

7 Claims. (Cl. 154—10)

This invention relates to tire-building apparatus and is especially useful where slabs of material comprising a tread are to be applied progressively to other material assembled on a rotatable form.

In the manufacture of pneumatic tire casings it has been the practice to assemble strips of material by wrapping them in succession about a collapsible and rotatable drum. These materials are either of rubber-like adhesive plastic material or, as in the case of fabrics or cords, have been coated with adhesive plastic materials. Due to the great flexibility and adhesive nature of the materials, it has been difficult to place the materials accurately and to eliminate entrapped air from between the strips. The adhesive nature of the materials makes it impossible to shift the strips after they have once contacted each other and seals in any entrapped air. It is desirable for these reasons to feed the strips accurately to their proper positions and to eliminate entrapped air by rolling pressure applied to the strips at the position of application.

Attempts made heretofore to mount stock-transfer trays or racks upon arms for swinging movement laterally of the drum about vertical axes, for a quick approach and retreat thereof from the tire-building drum, have not been fully satisfactory owing chiefly to the difficulty of obtaining true alignment of the rack with the drum. Deviations from the true alignment, even though slight, have greatly hampered the proper application of the stock to the drum, and in this laterally swinging structure, it has been difficult or impossible to avoid some angular or dimensional deviation from the true alignment of the rack at the drum, especially under conditions where the building up of material on the drum varies the desired terminal position of the rack.

It is also necessary to perform manual operations upon the material on the drum, and it is therefore desirable to provide space about the drum for the operator to work without interference of obstructions. When strips of rubber, such as tread slabs, are prepared by extruding or calendering unvulcanized rubber-like material, and are cut to length preparatory to applying them to the tire building drum, these strips shrink somewhat in length with an accompanying thickening of the ends of the slabs. In order to apply such slabs evenly about the drum, it is necessary to stretch the ends of the slab more than the portions between the ends to more evenly distribute the material.

The principal objects of the invention are to provide for overcoming the foregoing and other difficulties, to provide means for accurately and uniformly applying a slab of rubber-like material to the material on a rotatable drum, to provide an even distribution of the slab material, to provide for quick advance and retraction of the slab feeding means toward and away from the building drum, to provide for maintaining alignment of the feeding means with the drum, and to provide for accurately adjusting and controlling the advance of the slab.

These and other objects will appear from the following description and the accompanying drawings.

Of the drawings:

Fig. 1 is a side elevation of a tire-building drum and a slab feeding apparatus embodying the invention, the advanced position of the slab feeding mechanism being shown in full lines and the retracted position being indicated by dot-and-dash lines, parts being broken away.

Fig. 2 is a cross-sectional detail view taken on line 2—2 of Fig. 1, parts being broken away.

Fig. 3 is a detail sectional view taken on line 3—3 of Fig. 1, parts being broken away.

Fig. 4 is a plan view of the apparatus.

Fig. 5 is a detail sectional view, taken on line 5—5 of Fig. 1, parts being broken away.

Fig. 6 is a detail sectional view, taken on line 6—6 of Fig. 1, parts being broken away.

In accordance with the invention, a movable transfer table is mounted upon swinging arms, preferably in parallel motion, about horizontal axes so that true alignment with the building drum is assured at all times while quick advancing of the table and quick retraction thereof are provided for by the swinging movement. There is provision for power operation of the table from a position remote from the building drum to a position closely adjacent thereto in accurately aligned manner, and means are supported by the transfer table for rolling the slab progressively in place under varying compression at the position of application. Means are also provided for cushioning the movements of the table, for adjusting the mechanism for use on different sized drums, and for evenly distributing the slab material about the drum.

Referring to the drawings, the numeral 10 designates the frame of a tire-building machine having a spindle 11 which rotatably supports a collapsible building drum 12. Cord fabric or other materials 13 have been assembled about the drum, and a slab 14 of unvulcanized rubber-like material is shown in position to be applied thereto.

For supporting and feeding the slab, a bed plate 15 is mounted on the floor spaced away from the frame 10. A transfer table 16 is supported from the bed plate by swing frames 17, 18 pivotally mounted on horizontal axes on the bed plate and to the table, making possible a swinging movement of the table to and fro while the table is kept in true alignment with the drum at all times. The swing frames are preferably of equal length and parallel to each other so as to provide true parallel motion, but if desired one may be longer than the other to cause the slab to be fed down an incline to the drum or up an incline as desired. One of the frames, as for example the frame 18, may be made of sections 19, 20, one of which is adjustable along the other, and secured together by bolts 22, 22. This provides for adjusting the table to change the inclination of feed.

The table 16 is provided with rotatable antifriction rollers 23 across its face to support the slab with the least amount of resistance to endwise movement. Parallel guide bars 24, 25 are adjustably mounted on the table to confine the slab 14 and are secured by bolts 26 which engage slots 27 in the table.

For advancing and retracting the table a pair of brackets 28, 29 are mounted on the bed plate 15 and have bearings formed at their upper extremities in which a cradle 30 is rotatably supported for rocking movement on a horizontal axis. A double acting fluid-pressure-operated cylinder 31 is fixed to the cradle, and its piston rod 32 has its outer end pivotally secured to a cross bar 33 of swing frame 17. Air connections 34, 35 are provided at opposite ends of the cylinder and are connected to any suitable supply through a control valve (not shown) by flexible tubing permitting movement of the table.

For checking the movements of the table, rods 36 are adapted to slide through openings in the cradle 30 and are pivotally secured to rod 33. Stops 37, 38 are fixed to the rods, and coil springs 39, 40 encircle the rods adjacent the stops and are adapted to be compressed by contact with the cradle 30 at the ends of the stroke of the piston rod 32. The speed of the table movement is controlled by a fluid check comprising a cylinder 41 fixed to the cradle 30 and having a piston rod 42 connected at one end to a piston 43 fitting the cylinder and at the other end connected to rod 33. Each end of the cylinder is connected to a reservoir 44 by pipes 45, 46 respectively. Pipe 45 has a check valve 47 bypassed by a pipe 48 having a needle valve 49 therein. Pipe 46 has a check valve 50 bypassed by a pipe 51 having a needle valve 52. Upon outward movement of piston 43 caused by advance of the table by cylinder 31, liquid, such as oil, forward of the piston is prevented from flowing to the reservoir 44 by the check valve 47 and must flow by way of needle valve 49 whereas liquid may flow unrestricted from the reservoir 44 through check valve 50 to the rear end of the cylinder. Adjustment of needle valve 49 therefore controls the speed of advance movement. Upon return of the table, liquid from the rear of the cylinder 41 is restricted by check valve 50 and needle valve 52 from flow toward the reservoir and flow of liquid from the reservoir to the front end of the cylinder 41 is unrestricted by check valve 47 so that needle valve 52 controls speed of the return movement and forward and return movement of the table may be set at different speeds. Air from any convenient source is supplied by a valve (not shown) to control the table movements.

For rolling the slab onto the drum a pair of arms 60, 61 are fixed to a horizontal shaft 62 journaled in the table 16. These arms are inclined to the table and extend forwardly and upwardly therefrom. A lever arm 63 is also fixed to shaft 62 and extends downwardly and rearwardly. A second horizontal shaft 65 is journaled in bearings 67, 68 fixed to the table. One end of the shaft 65 has a worm gear 66 fixed thereto. A worm 69 on a shaft 70 also journaled in bearing 68 meshes with the worm gear and may be turned by a hand wheel 71 on the shaft to rotate shaft 65. An eccentric bushing 72 is fixed to shaft 65 and a fluid pressure operated cylinder 73 is pivotally mounted on the bushing. This cylinder is of the double-acting type and its piston 74 is connected by a piston rod 75 to arm 63 by a pivotal connection 76.

The arrangement is such that by adjustment of hand wheel 71, the fulcrum point of cylinder 73 may be shifted and the moment arm of the force exerted by the piston on the lever 63 about its fulcrum 62 may be changed.

Arms 60, 61 have bearings formed in their outer ends in which a shaft 80 is journaled. The shaft has reduced journals 81, 82 eccentric to the body of the shaft. A quill shaft 83 is rotatably mounted on the body of the shaft between a collar 84 and a gear 85 fixed to the shaft. A tread roller 86 is keyed to quill 83. An arm 87 has a bearing at one end thereof which rotatably embraces the body of shaft 80. Its opposite end is formed with a bearing parallel thereto in which a shaft 88 is journaled. Shaft 88 has a large gear 89 fixed to one end thereof, and a small gear 90 fixed to the other end. Gear 90 meshes with gear 85 and gear 89 meshes with a small gear 91 formed integral and concentric with quill 83. The arrangement is such that when roller 86 is driven by contact with the slab 14 it rotates gear 91 which drives gear 89 which turns shaft 88 driving gear 90 which in turn drives shaft 80 at a slower velocity than the quill, and due to the eccentricity of shaft 80 the roller 86 is successively moved toward and from the shaft 62 which is the fulcrum of the lever having as lever arms, arms 60, 61, and 63, so that the force applied from piston 74 to roller 86 is increased or decreased by adjustment of the lever arm 63 and the roller 86 is moved toward and away from the building drum.

To prevent arm 87 from rotation but to permit movement thereof radial of shaft journals 81, 82 under influence of the eccentric movement of the shaft 80 on which it has a bearing, a slot 100 is provided in arm 60 and the end 101 of shaft 88 is extended so as to be confined in the slot. An arm 103 fixed to shaft 80 acts as an indicator to show the position of the shaft with respect to its eccentric journals. The ratio of the gearing is such that during one rotation of the drum 12 the roller 86 is forced toward the drum once in a direction crossing the direction of movement of the table 16 by the eccentric shaft and this provides additional pressure to that ordinarily afforded by the cylinder 73.

Adjustment is provided for drums of different diameters by adjusting the fulcrum of the swing frame 17. For this purpose bearings 201, 202 are formed on the bed plate 15 and bushings 203, 204 fixed to a shaft 105 extending therebetween are rotatably mounted in such bearings. These bearings have removable caps 201¹, 202¹. Pintles 106, 107 are mounted eccentrically on the ends of the bushings 203, 204 respectively and provide fulcrums for the swing-frame 17. A disc 108 is fixed to shaft 105 and has spanner sockets 109 in its periphery whereby it may be rotated and with it the shaft 105 and bushings 203, 204. After adjusting the shaft, the caps 201¹, 202¹ of the bearings, may be tightened to hold the adjustment. Despite adjustment for drums of different diameters, true alignment is maintained by the provision of the swinging arms on horizontal axes, as hereinbefore described.

For guiding the tread slab accurately as it approaches the drum, conical faced guide rollers 120, 121, 122, and 123 are rotatably mounted on yokes 124, 125 so as to engage with their faces shoulders of the slab, as seen in Fig. 5. The yokes 124, 125 are slidably adjustable along a rod 126 provided with keyway 127 to prevent their rotation thereabout. The ends of the rods are threaded, and stop nuts 128, 129 are provided for engaging the threads and adjusting the guide rollers laterally of the slab. A compression coil spring 130 encircles the rod between the yokes to keep them against the stop nuts. Rod 126 is secured at its ends to threaded bushings 131, 132 engaged by vertically disposed feed screws 133, 134. These screws are rotatably mounted in brackets 135, 136, fixed to the table. Sprocket wheels 137, 138 are fixed to screws 133, 134 respectively, and a chain 139 engages the sprockets so that they turn in unison. A crank 140 is provided for turning the screw 134 to raise or lower the yokes and guide wheels.

The roller 86 which contacts with the slab for driving the shaft 80 therefrom is contoured to the cross sectional shape of the slab, and to provide traction its face is preferably coarsely knurled. Additional rollers 150, 151 may be provided flanking the roller 86. These rollers may be mounted on anti-friction bearings 152, 153 supported by the quill shaft 83. Their slab contacting faces are preferably of soft cushion rubber vulcanized to metal hubs.

In the operation of the machine, a slab 14 is laid on the table 16 with the table in the dot-and-dash position of Fig. 1. When the slab is to be applied, air is admitted to pipe 35 of cylinder 31 propelling the table toward the drum. The table stops with its leading end near the drum face and the leading end of the slab tangential to the drum face and in contact therewith. Air is now admitted to the forward end of cylinder 73 forcing roller 86 against the slab which it presses against the drum. The drum is then set in motion and the slab is drawn off the table and around the drum. Before starting the slab onto the drum the operator sets the indicator 103 to a predetermined position and during the rotation of the drum, the roller 86 presses with greater pressure against the drum at the region of the splice than at other regions. Should the tread be improperly applied, as when the slab is too short, the drum may be reversed and the tread will be fed back onto the table. By adjusting the table to a position inclined to the horizontal with its delivery end lowermost, stretching of the tread may be avoided whereas by raising the delivery end some stretching of the tread due to its weight may be accomplished.

By adjusting the worm shaft 70 and consequently the eccentric bushing 72 the fulcrum of cylinder 73 and therefore the resulting pressure of the roller 86 against the tread slab on the drum may be adjusted.

Variations may be made without departing from the scope of the invention as it is defined by the following claims.

I claim:

1. Apparatus for applying a slab of rubber-like material about the surface of a rotatable building drum, said apparatus comprising a transfer table for supporting a slab in alignment with the drum, power-operated means for moving the table toward and away from the drum to present the slab to the face of the drum, and roller means carried by the table for applying the slab progressively to the drum, said last-named means comprising a pressing roller, means for applying a constant pressure thereto toward the face of the drum throughout a major portion of the arc of rotation of the drum, and means for increasing the pressure over a determinate arc of rotation of the drum.

2. Apparatus for applying a slab of rubber-like material about the surface of a rotatable building drum, said apparatus comprising a transfer table for supporting a slab in alignment with the drum, power-operated means for moving the table toward and away from the drum to present the slab to the face of the drum, and roller means carried by the table for applying the slab progressively to the drum, said last-named means comprising a pressing roller, means for applying a constant pressure to said roller to press the slab progressively against the face of the drum throughout a major portion of the arc of rotation of the drum, and means for increasing the pressure as the ends of the slab pass under the roller.

3. Apparatus for applying a slab of rubber-like material about the surface of a rotatable building drum, said apparatus comprising a transfer table for supporting a slab in alignment with the drum, power-operated means for moving the table toward and away from the drum to present the slab to the face of the drum, means for regulating the speed of the table movements, and roller means carried by the table for applying the slab progressively to the drum, said roller means comprising a roller arranged for bodily movement toward and away from the drum in a direction crossing the direction of the table movement and means for so moving said roller.

4. Apparatus for applying a slab of rubber-like material about the surface of a rotatable building drum, said apparatus comprising a transfer table for supporting a slab in alignment with the drum, power-operated means for moving the table bodily endwise toward the drum to present the end of the slab thereto and for retracting the table bodily to clear the drum, means for adjusting the inclination of the table to present the slab at different inclinational positions, and roller means carried by the table for applying the slab progressively to the drum.

5. Apparatus for applying a slab of rubber-like material about the surface of a rotatable building drum, said apparatus comprising a transfer table for supporting a slab in alignment with the drum, power-operated means for moving the table toward and away from the drum to present the end of the slab over the face of the drum with the slab substantially tangential thereto, means on said table for applying the slab progressively to the drum, said means comprising a pressing roller adapted to be rotated by contact with a portion of the slab on said drum, and means on said table for pressing the roller against said drum with progressive change of pressure, said means comprising a lever arm supporting said roller, pressure means for urging the roller against the drum by force applied through said lever arm, and means for progressively changing the effective length of said lever arm during a rotation of the drum.

6. Apparatus for applying a slab of rubber-like material about the surface of a rotatable building drum, said apparatus comprising a transfer table for supporting a slab in alignment with the drum, power-operated means for moving the table toward and away from the drum to present the end of the slab over the face of the drum with the slab substantially tangential thereto, means on said table for applying the slab progressively to the drum, said means comprising a pressing roller adapted to be rotated by contact with a portion of the slab on said drum, and means on said table for pressing the roller against said drum with progressive change of pressure, said means comprising a lever arm supporting said roller, a fluid-pressure cylinder for urging said roller against said drum by pressure applied through said lever arm, and means for progressively changing the effective length of said lever arm during rotation of said drum.

7. Apparatus for applying a slab of rubber-like material about the surface of a rotatable building drum, said apparatus comprising a transfer table for supporting a slab in alignment with the drum, power-operated means for moving the table endwise toward and away from the drum to present the end of the slab to the face of the drum, and roller means carried by the table for applying the slab progressively to the drum, said roller means comprising a roller mounted for movement toward and away from said drum in a direction crossing the direction of the table movement, and means for so moving said roller.

CHARLES W. LEGUILLON.